United States Patent
Cao

(10) Patent No.: US 8,740,491 B2
(45) Date of Patent: Jun. 3, 2014

(54) LOCKING APPARATUS

(75) Inventor: Xiang Cao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 281 days.

(21) Appl. No.: 13/340,715

(22) Filed: Dec. 30, 2011

(65) Prior Publication Data
US 2013/0156489 A1 Jun. 20, 2013

(30) Foreign Application Priority Data
Dec. 17, 2011 (CN) .................. 2011 1 10423715

(51) Int. Cl.
*B23B 31/26* (2006.01)

(52) U.S. Cl.
USPC .......................................... 403/32; 340/687

(58) Field of Classification Search
USPC ............... 403/27, 32, DIG. 5, 299, 343, 370, 403/374.3, 374.4, 408.1; 200/17 R, 43.01, 200/43.04, 43.08, 52 R, 61.41, 61.42, 507; 340/686.1, 686.4, 687
See application file for complete search history.

(56) References Cited

U.S. PATENT DOCUMENTS

| | | | | | |
|---|---|---|---|---|---|
| 4,542,373 A | * | 9/1985 | Hillock | ........................ | 340/984 |
| 5,047,753 A | * | 9/1991 | Birchfield | .................... | 340/984 |
| 5,179,343 A | * | 1/1993 | Chishima et al. | ............. | 324/538 |
| 5,966,080 A | * | 10/1999 | Bigsby | ........................ | 340/686.4 |
| 7,191,722 B1 | * | 3/2007 | Plost | ............................ | 114/197 |

\* cited by examiner

*Primary Examiner* — Joshua Kennedy
*Assistant Examiner* — Daniel Wiley
(74) *Attorney, Agent, or Firm* — Novak Druce Connolly Bove + Quigg LLP

(57) ABSTRACT

A locking apparatus includes a first threaded member, a second threaded, two pins, an alarm, and a micro-control unit. When the second threaded member engages in the first threaded member, the micro-control unit deactivates the alarm. When the second threaded shank disengages from the first threaded member, the micro-control unit activates the alarm.

2 Claims, 3 Drawing Sheets

LOCKING APPARATUS

BACKGROUND

1. Technical Field

The present disclosure relates to a locking apparatus.

2. Description of Related Art

Enclosures of electronic devices are usually secured with screws. Components, such as memory modules, can easily be stolen from the electronic devices by unscrewing the screws. Therefore there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
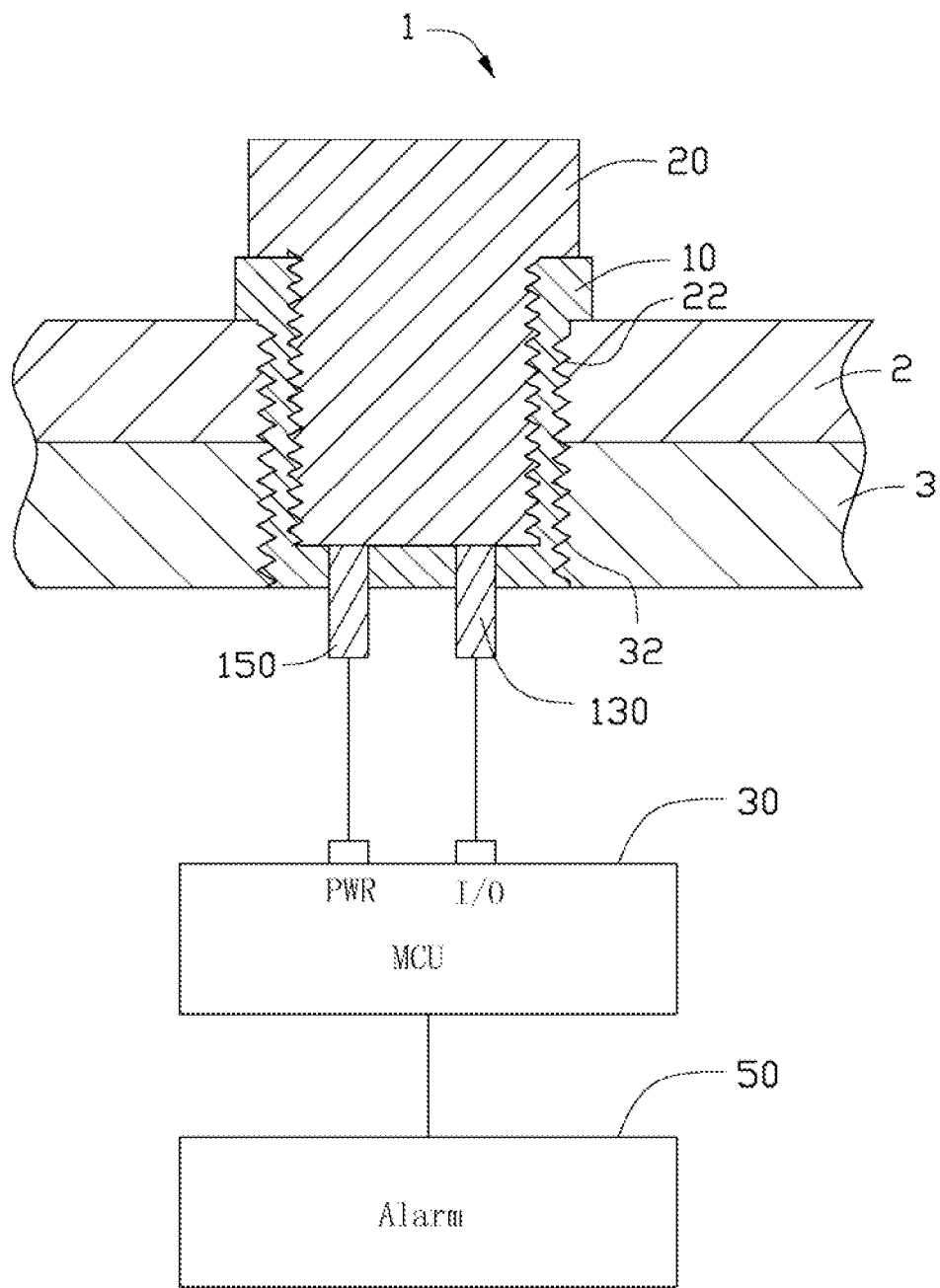
FIG. 1 is a partial cross-sectional and schematic view of an exemplary embodiment of a locking apparatus, together with two objects to be connected.

FIG. 1, is an exemplary embodiment of a locking apparatus 1 including a first threaded member 10, a second threaded member 20, a micro-control unit (MCU) 30, and an alarm 50. The locking apparatus 1 is for locking a first object 2 and a second object 3. A first mounting hole 22 is defined in the first object 2, extending through a top and a bottom. A second mounting hole 32 is defined in the second object 3, extending through a top and a bottom. In use, the first threaded member 10 is engaged in the mounting holes 22 and 32 to connect the first object 2 to the second object 3.

The first threaded member 10 is connected to the MCU 30. The MCU 30 is further connected to the alarm 50 with a control terminal. When the second threaded member 20 is screwed in the first threaded member 10, the MCU 30 receives a first signal, such that the alarm 50 is not activated. When the second threaded member 20 is disengaged from the first threaded member 10, the MCU 30 receives a second signal, such that the alarm 50 is activated.

Figure 2:
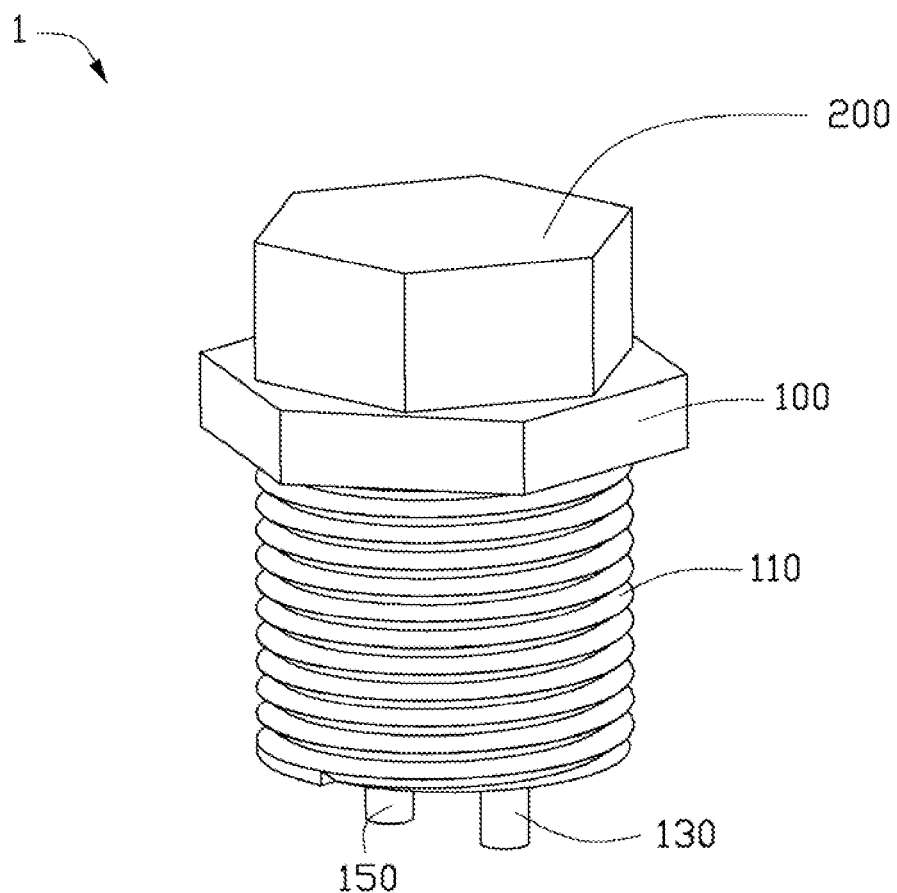
FIG. 2 is an isometric view of the locking apparatus of FIG. 1.
Figure 3:
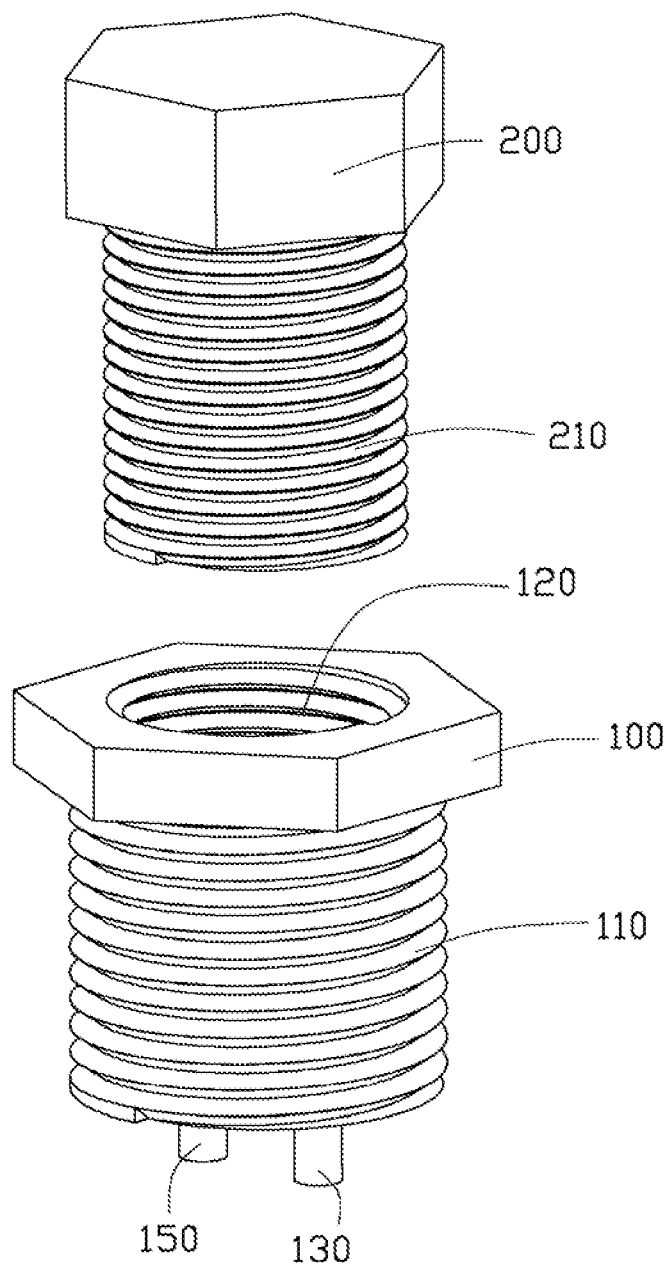
FIG. 3 is an exploded, isometric view of the locking apparatus of FIG. 2.

FIGS. 2 and 3, shows the first threaded member 10 including a hexagonal head portion 100, and a threaded shank 110 extending from a bottom of the head portion 100. An accommodating hole 120 is defined along an axis of the first threaded member 10, and extends through the head portion 100. Two conductive pins 130 and 150 extend through and are insulated from a bottom of the threaded shank 110. Distal ends of the pins 130 and 150 extending outside the threaded shank 110 are respectively connected to a power terminal PWR and an input/output terminal I/O of the MCU 30.

The second threaded member 20 includes a hexagonal head portion 200, and a threaded shank 210 extending from a bottom of the head portion 200. A diameter of the head portion 200 is greater than a diameter of the accommodating hole 120, and is less than a diameter of the head portion 100.

In use, the threaded shank 110 engages in the mounting holes 22 and 32 to connect the first object 2 to the second object 3. The threaded shank 210 engages in the accommodating hole 120. At this time, a bottom of the threaded shank 210 contacts with the pins 130 and 150, such that the pins 130 and 150 are connected to each other. As a result, the input/output terminal I/O receives a high level signal from the power terminal PWR, and the MCU 30 does not activate the alarm 50.

Generally speaking, when a person who does not know the pattern of the locking apparatus 1 and wants to disconnect the first object 2 from the second object 3, the person would operate the second threaded member 20 first. At this time, when the second threaded member 20 is disengaged from the accommodating hole 120, the pin 130 is disconnected from the pin 150. As a result, the input/output terminal I/O does not receive the high level signal from the power terminal PWR, and the MCU 30 activates the alarm 50. Moreover, when the alarm 50 is activated, the person only disengages the second threaded member 20, namely the person cannot disconnect the first object 2 from the second object 3. At this time, the authorized user can stop the person in a timely manner.

The foregoing description of the exemplary embodiments of the disclosure has been presented only for the purposes of illustration and description and is not intended to be exhaustive or to limit the disclosure to the precise forms disclosed. Many modifications and variations are possible. The embodiments were chosen and described in order to explain the principles of the disclosure and their practical application so as to enable others of ordinary skill in the art to utilize the disclosure and various embodiments and with such modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than by the foregoing description and the exemplary embodiments described therein.

What is claimed is:

1. A locking apparatus for locking a first object to a second object, comprising:
   a first threaded member comprising a first threaded shank, wherein a threaded accommodating hole is defined through a center axis of the first threaded member, the first threaded shank engages in mounting holes of the first object and the second object to connect the first object to the second object;
   a second threaded member comprising a second threaded shank;
   first and second conductive pins extending from the accommodating hole through a bottom of the first threaded shank and insulated from the bottom of the first threaded shank;
   an alarm; and
   a micro-control unit comprising a power terminal connected to a first end of the first pin located outside the accommodating hole, an input/output terminal connected to a first end of the second pin located outside the accommodating hole, and a control terminal connected to the alarm;
   wherein when the second threaded shank engages in the accommodating hole and contacts with second ends of the first and second pins located in the accommodating hole, the first and second pins are connected to each other, such that the power terminal is connected to the input/output terminal, the micro-control unit deactivates the alarm;

when the second threaded shank disengages from the accommodating hole, the first and second pins are disconnected from each other, such that the power terminal is disconnected from the input/output terminal, the micro-control unit activates the alarm.

2. The locking apparatus of claim 1, wherein the first threaded member further comprises a first head portion, the first threaded shank extends from a bottom of the first head portion, the second threaded member further comprises a second head portion, the second threaded shank extends from a bottom of the second head portion, a diameter of the second head portion is greater than a diameter of the accommodating hole, and is less than a diameter of the first head portion.

\* \* \* \* \*